Figure 1:
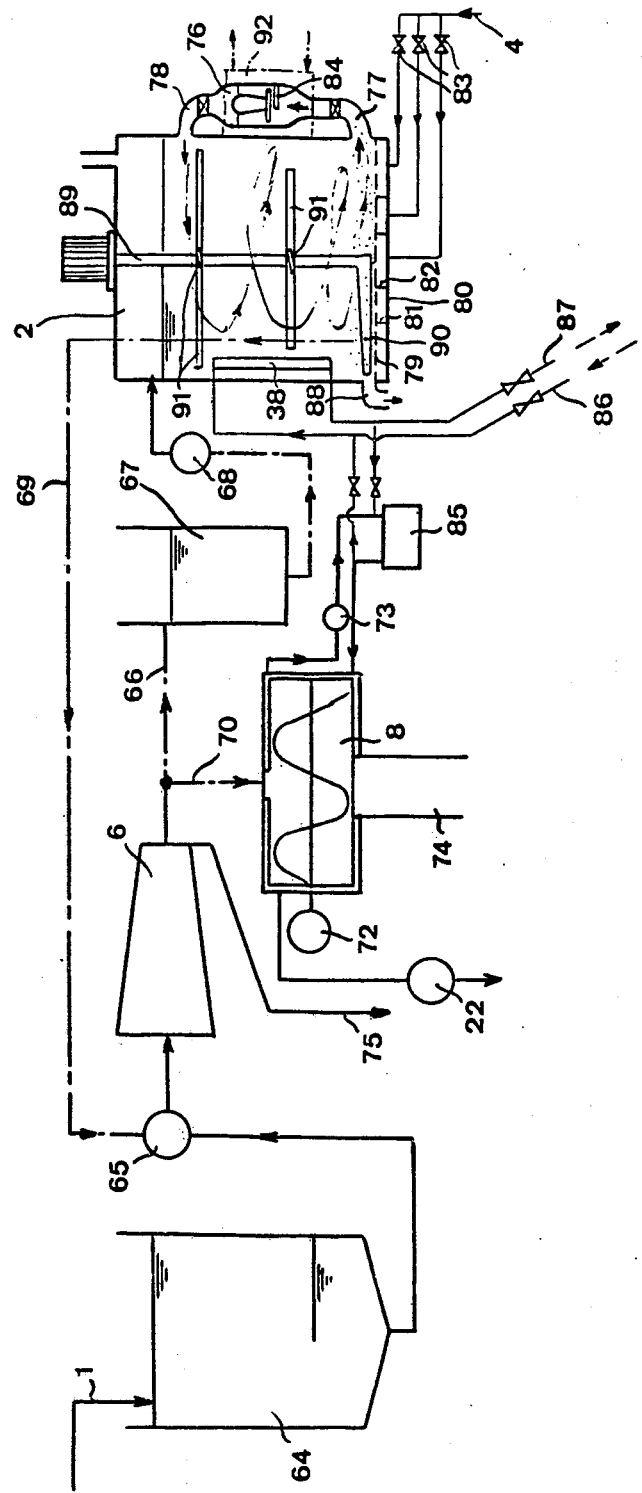

United States Patent [19]

Kaelin

[11] 4,204,958
[45] May 27, 1980

[54] METHOD AND APPARATUS FOR TREATMENT OF SLUDGE

[75] Inventor: Joseph Richard Kaelin, Buochs, Switzerland

[73] Assignee: Union Carbide Corporation, New York, N.Y.

[21] Appl. No.: 928,427

[22] Filed: Jul. 27, 1978

Related U.S. Application Data

[63] Continuation of Ser. No. 740,884, Nov. 11, 1976, abandoned.

[30] Foreign Application Priority Data

| Nov. 12, 1975 | [CH] | Switzerland | 14705/75 |
| Dec. 31, 1975 | [CH] | Switzerland | 16932/75 |
| Feb. 19, 1976 | [CH] | Switzerland | 2022/76 |
| Oct. 25, 1976 | [CH] | Switzerland | 13471/76 |

[51] Int. Cl.$^2$ .................................................. C02C 3/00
[52] U.S. Cl. .............................. 210/178; 210/195.3; 210/219

[58] Field of Search ................. 210/4, 6, 7, 10, 12–15, 210/44, 66, 195 R, 195 S, 197, 219, 220, 221 P, 178, 179

[56] References Cited

U.S. PATENT DOCUMENTS

| 3,151,063 | 9/1964 | Gunson | 210/7 |
| 3,220,706 | 11/1965 | Valdespino | 210/5 |
| 3,338,826 | 8/1967 | Kramer | 210/12 |
| 3,345,288 | 10/1967 | Sontheimer | 210/66 |
| 3,462,275 | 8/1969 | Bellahy | 210/12 |
| 3,493,494 | 2/1970 | Knibb | 210/12 |
| 3,997,437 | 12/1976 | Prince et al. | 210/195 S |

Primary Examiner—Benoit Castel
Attorney, Agent, or Firm—Eric P. Schellin; Anne M. Kornbau

[57] ABSTRACT

The invention concerns an apparatus for the continuous treatment of wet sludge produced in a sewage treatment plant.

7 Claims, 2 Drawing Figures

METHOD AND APPARATUS FOR TREATMENT OF SLUDGE

This is a continuation of application Ser. No. 740,884, filed Nov. 11, 1976, now abandoned.

Among the known processes is that of mixing cold wet sludge with refuse or some other dry substance and subsequently aerating it in a treatment chamber, also called aeration reactor, with the result that the biological conversion process induced generates heat and that, after an adequately long aeration period in the aeration reactor, a type of humus is produced.

However, the known processes have the disadvantage that the material to be aerated, being very wet and cold, requires very long aeration periods in the aeration reactor and therefore a high energy input for aeration as well as a large aeration reactor involving high cost and occupying much space.

The object of the present invention is to provide an apparatus for a process which does not have the foregoing drawbacks, yet nevertheless ensures a biologically satisfactory final product.

The process carried out by the apparatus claimed hereunder is characterized in that the wet sludge, prior to entering a wet sludge aeration chamber, is dewatered by a dewatering device to a water content of 90% maximum, preferably to one of 90 to 70%; and that the sludge thus dewatered is circulated in the wet sludge aeration chamber and concurrently aerated with an oxygen-containing gas or with pure oxygen, in such a manner that temperatures ranging from 40° to 80° C. are developed in the sludge by the biological conversion process; and that concurrently also the sludge circulating in the wet sludge aeration chamber is brought into contact with a heat exchanger for the purpose of regulating the said temperature; and that, after a certain time, the sludge thus treated is removed from the wet sludge aeration chamber and, while still warm, is further dewatered to a water content of 80 to 50%, in which process it is advantageous to regulate the temperature of the sludge present in the wet sludge aeration chamber to a level between 60° and 75° C. by means of the heat exchanger.

Once the biologically treated sludge has been removed from the wet sludge aeration chamber and dewatered to a water content of 80 to 50%, it may be advantageous to add solids to it and/or expose the biologically treated sludge, or more particularly the sludge-solids mixture, to composting.

Through the treatment of the fresh wet sludge in a wet sludge aeration chamber at a temperature ranging from 40° to 80° C., the biological conversion of the sludge present in the chamber is effected by thermophilic bacteria. The advantage of thermophilic digestion in a wet sludge aeration chamber is that it proceeds substantially more rapidly than the known processes hitherto operated at substantially lower temperatures without thermophilic bacteria, and also that it requires relatively small installations of simple design.

Moreover, for the optimization of the process, it has been found important that the temperature of the sludge in the wet sludge aeration chamber should only vary between certain limits, because at unduly low temperatures, such as may occur when fresh sludge is added, the conversion proceeds too slowly or does not start at all, while at unduly high sludge temperatures the microorganisms causing the biological conversion die and the conversion therefore ceases. According to the present invention, the regulating of the desired temperature of the sludge in the wet sludge aeration chamber is effected by means of the heat exchanger.

For the production of loose, pasteurized humus, it is in many cases advantageous that the sludge which has been biologically treated in the wet sludge aeration chamber and subsequently further dewatered to a certain water content should be aerated in known manner in an aeration reactor with a view to composting; and for this it may be advantageous to admix solids such as sawdust, ground tree bark or ground refuse to the sludge prior to composting.

Compared with the known processes in which the wet sludge is only treated in an aeration reactor, i.e. in which there is no wet sludge aeration chamber on the input side, the wet sludge treatment process described herein, which takes place in two main stages, has the advantage that the thermophilic digestion in the wet sludge aeration chamber permits the time of residence of the material in the subsequent aeration reactor to be reduced in many cases to about 50% of the very long time of residence necessary in the known processes, so that the relatively complex aeration reactor can be made far smaller than hitherto, and the time of residence of the material in the entire treatment plant is considerably reduced as compared with the known plants including an aeration reactor, because in all these sludge treatment plants the aeration reactor required for the aeration of the dewatered sludge claims the greater part of the time of residence necessary in the entire treatment plant. Moreover, the total investment for the aeration of the material can be sharply reduced through the use of the process claimed hereunder, as compared with the known processes. Again, the dewatering of warm sludge involves far less energy than does the dewatering of cold sludge.

As the aeration gas, such as air, air enriched with pure oxygen or pure oxygen, which is injected near the floor of the wet sludge aeration chamber must be prevented from taking the shortest path vertically upwards and there escaping from the sludge, it is advantageous to provide for rotation of the sludge present in the wet sludge aeration chamber about an imaginary vertical axis.

Also, to obtain as small a quantity as possible of biologically treated sludge, it is advantageous to fix the time of residence of the sludge in the wet sludge aeration chamber in such a manner that through the biological decomposition the organic components in the liquid in the wet sludge aeration chamber are reduced in that time by at least 30%, preferably by at least 45%.

So as to need only one dewatering unit, it is further advantageous to use the same dewatering unit alternately to dewater the sludge to be fed to the wet sludge aeration chamber and the sludge removed from the latter.

The apparatus of the present invention is characterized in that it comprises a dewatering unit for the dewatering of the wet sludge to be treated; a heat-insulated wet sludge aeration tank equipped with circulation and aeration means and designed to receive, circulate and aerate the dewatered sludge coming from the dewatering unit; a heat exchanger which is in heat-exchange contact with the sludge circulating inside the wet sludge aeration tank and which is designed for the at least temporary additional heating or cooling of the sludge circulating inside the wet sludge aeration tank to a desired temperature; and a dewatering unit for the further dewatering of the sludge leaving the wet sludge aeration tank.

To avoid having to empty the entire wet sludge aeration tank in the event of a fault arising in the circulation mechanism, it is advantageous to arrange the circulation mechanism outside the wet sludge aeration tank and to connect it with the inside of the said tank by a feed duct and a discharge duct which are capable of being shut off and which open into the said tank in a direction at least approximately tangential at points which are vertically spaced apart, the arrangement being such that the sludge in the said tank circulates through the latter along a helical path. Also, for optimal exploitation of the oxygen injected into the sludge, it is advantageous to arrange and design the circulation means in such a manner that the sludge in the said tank rotates at least approximately about an imaginary vertical axis.

Figure 2:
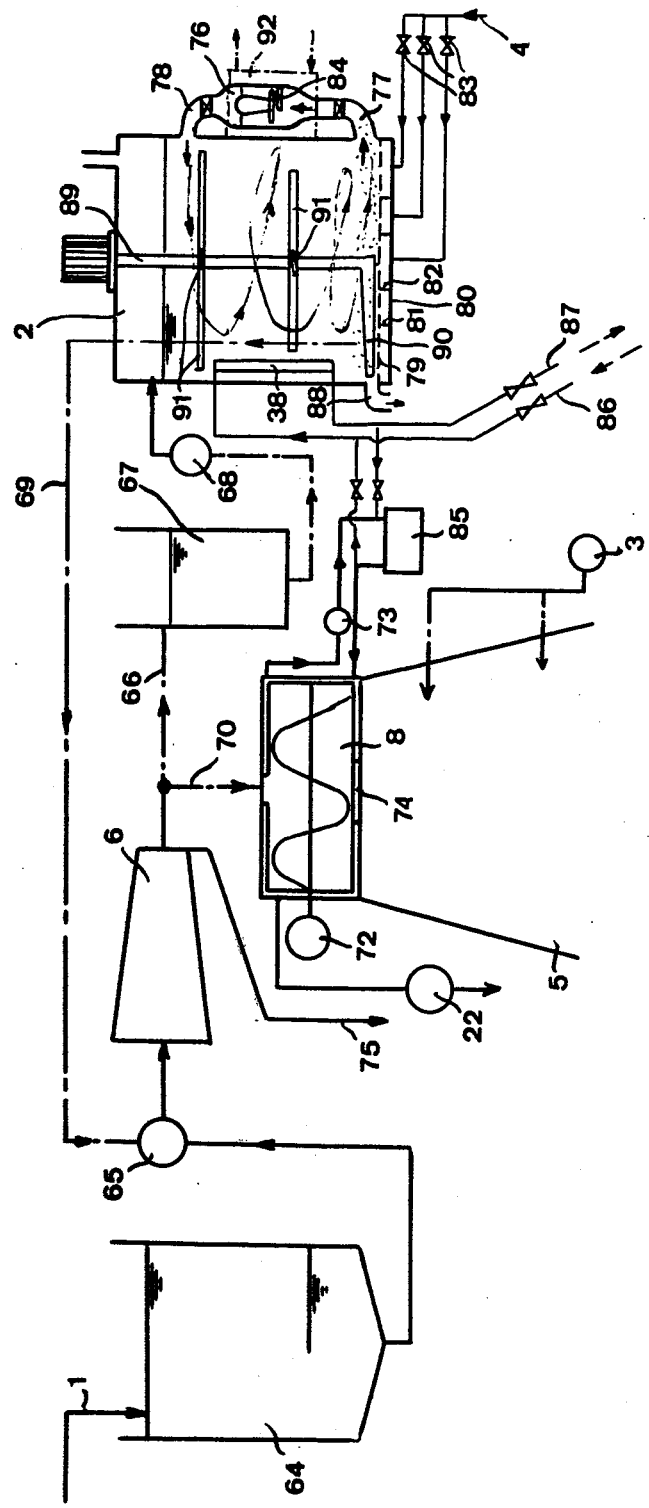

The present invention is now to be illustrated by way of example with reference to the drawings, in which FIG. 1 shows a first embodiment of a system according to the invention; and FIG. 2 shows a second embodiment of a system according to the invention.

In the embodiment shown in FIG. 1, the wet sludge, which comes from the sewage treatment plant in irregular quantities and has a water content of about 96%, passes through a duct 1 to a storage tank 64 and is stored therein. A sludge pump 65 intermittently draws wet sludge from the storage tank 64 and forwards it to a dewatering unit 6, where the sludge is dewatered to a water content of about 85%. This dewatered sludge then passes through the duct 66 to a buffer store 67, whence the pump 68 forwards it in the desired quantity to the wet sludge aeration tank 2, in which the highly concentrated sludge is supplied with technically pure oxygen from the duct 4 connected to an oxygen supply. Viewed from above, the wet sludge aeration tank 2 presents a circular cross-section; to avoid having to empty the entire tank 2 in the event of the circulation device 76 requiring to be dismantled, the circulation device 76 is arranged outside the tank 2 and connected to the inside of the tank 2 by a feed duct 77 and a discharge duct 78 which are both capable of being shut off by a slide valve. To prevent any clogging of the circulation device 76 with certainty, the inlet edges of the blades of the circulation device 76 interact with a fixed knife 84. The feed duct 77 and the discharge duct 78 open into the tank 2 in an approximately tangential direction at points vertically spaced apart, so that the sludge present in the tank 2 circulates through the latter along a helical path.

For the purpose of introducing the oxygen into the sludge in the tank 2, this is provided with a finely perforated false floor 79, and the feed ducts for the oxygen open between this perforated false floor 79 and the actual floor 80. For more effective regulating of the oxygen to be injected into the sludge, the space between the perforated false floor 79 and the actual tank floor 80 is divided into three separate chambers by two concentrically arranged partitions 81 and 82 which are annular in plan. Each of the three chambers is separately connected to the supply duct 4 by a regulating device 83, so that the oxygen quantity injected into the sludge through the chambers can be controlled separately for each chamber.

The circulation device 76 circulates the sludge in the tank 2 and thus prevents the oxygen bubbles which enter through the perforated false floor 79 from rising vertically, so that these bubbles remain very long in the sludge, and the oxygen contained in the bubbles is completely taken up by the aerobic microorganisms.

The create optimal conditions for the biological conversion process in the wet sludge aeration tank 2, this tank is provided inside with a heat exchanger 38 which permits the sludge in the tank 2 to be additionally heated by means of a heater 85 or to be cooled by the passage of cooling water through the supply duct 86 and the discharge duct 87. When the system is started, it is necessary to heat the cold sludge in the tank 2 by means of the heat exchanger 38 to at least 30° C., or the biological conversion process will not start. During normal operation of the system, it is important to keep the temperature of the sludge in the tank 2 within the range 60°-70° C., because at too low a temperature the biological conversion will proceed too slowly, while at too high a temperature the microorganisms necessary for the biological conversion process will die, and conversion will cease. For this purpose, the system further comprises a control device with temperature sensors which causes hot or cold water to be passed through the heat exchanger 38, accordingly.

Waste sludge may be withdrawn from the wet sludge aeration tank 2 through conduit 88. Sludge within the tank is maintained in suspension by mixing blade members 91 disposed on a vertical rotatable drive shaft 89, having disposed at its lower end a floor clearer 90.

To obtain as small a quantity as possible of biologically treated sludge, the time of residence for the sludge present in the tank 2 is fixed in a manner ensuring that through the biological decomposition the organic components of the liquid in the tank 2 are reduced in that time by at least 45%.

Once the biological conversion proceeding in the tank 2 has attained the desired conversion degree, the feed of wet sludge from the storage tank 64 is interrupted, and the sludge pump 65 is connected to the tank 2 by the duct 69, so that the biologically pretreated and pasteurized warm sludge, which already presents a reduced water content, is again passed to the dewatering unit 6, where it is dewatered to a water content of about 60%.

The biologically pretreated sludge thus dewatered is then passed to a mixer 8 which is driven by a motor 72 and whose discharge duct 74 extends downwards. In this mixer 8, about 10 to 20% dry additive material, which is taken from a store and fed by a supply duct, is admixed to the sludge for the purpose of loosening up the latter. For further dewatering of the sludge present in the mixer 8, a negative pressure unit 22 develops a negative pressure in the mixer 8, so that humid air and water vapor are drawn off and passed to a condenser for condensation.

To promote biological conversion and dewatering, the mixer 8 is surrounded by a space through which a pump 73 sends a heat exchange fluid which is heated the dewatering of the wet sludge in successive stages, resulting in optimal utilization of the dewatering unit 6.

Instead of arranging the heat exchanger 38 inside the tank 2, it is possible to arrange a heat exchanger 92 on the outside of the circulation device 76, so that, in the event of a fault in the heat exchanger, this can be removed, repaired and re-installed without it being necessary to empty the tank 2.

The embodiment shown in FIG. 2 differs from that shown in FIG. 1 only in that the discharge opening of the mixer 8 communicates without heat loss directly with the inside of an aeration reactor 5 serving composting.

An oxygen supply arrangement 3 connected to supply ducts is provided for the supply of technically pure oxygen into the interior of the treatment chamber of the aeration reactor 5.

With certain sludge compositions, the biologically treated sludge taken from the tank 2 and dewatered further in the dewatering unit 6 can be forwarded directly to the aeration reactor 5 without any admixing of additional solids in a mixer.

Also, the biologically treated sludge taken from the wet sludge aeration tank 2 and dewatered further in the dewatering unit 6 can be composted in stacks, either with or without the admixture of additional solids such as sawdust, ground tree bark, draff and/or ground refuse.

I claim:

1. Apparatus for continuous treatment of wet sludge from a sewage treatment plant comprising:
    (a) dewatering means with an inlet for supplying wet sludge thereto and an outlet for discharge of dewatered sludge therefrom, said dewatering means reducing the wet sludge to a maximum water content of 90%;
    (b) a heat insulated wet sludge aeration vessel, said vessel being provided with an inlet, an outlet, and circulation means for circulating the dewatered sludge in the interior of the vessel and with aeration means for concurrently aerating the sludge with an oxygen-containing gas to develop temperatures of from 40° C. to 80° C. in the sludge by a thermophilic digestion biological conversion process, said circulationg means being located outside of the wet sludge aeration vessel and being fluidly connected to the interior thereof by a supply duct and a discharge duct with means disposed therein to render them capable of being shut off; the supply duct and the discharge duct opening into the wet sludge aeration vessel in an approximately tangential direction at points vertically spaced apart such that the sludge present in the aeration vessel is circulated along a helical path;
    (c) conduit means connecting the outlet of the dewatering means with the inlet of said heat insulated wet sludge aeration vessel for transfer of dewatered sludge from the dewatering means to said wet sludge aeration vessel;
    (d) a heat exchanger in heat exchange contact with the sludge circulating inside the vessel, and said inlet of said dewatering means being connected by conduit means to the outlet of the heat insulated wet sludge aeration vessel to reduce the sludge to a water content of from about 50% to about 80%; and
    (e) means for discharging finally dewatered sludge from said dewatering means.

2. Apparatus according to claim 1 wherein the wet sludge aeration vessel is provided with an upper, perforated floor and a lower floor, and means for injecting said oxygen-containing gas into the wet sludge aeration vessel between the upper floor and the lower floor of the aeration vessel.

3. Apparatus according to claim 2 wherein the space between the upper floor and the lower floor is divided into at least two separate chambers by at least one vertically extending partition, and wherein each chamber is separately connected by a regulating means to a feed means to provide separate control of injection of said oxygen-containing gas.

4. Apparatus according to claim 1 wherein a vertical rotatable drive shaft is located in the center of the aeration vessel, said drive shaft being connected to a floor clearer.

5. Apparatus according to claim 4 wherein the drive shaft is provided with blades designed for liquid propulsion, said blades arranged to impart a downward-twisting motion to any liquid present in the wet sludge aeration vessel.

6. Apparatus according to claim 1 wherein the discharging means is connected via a mixer to a feed opening of an aeration reactor for feeding twice dewatered and treated sludge to the aeration reactor.

7. Apparatus according to claim 1 wherein means are provided for fixing the residence time of the sludge in the heat insulated wet sludge aeration vessel to provide for reducing organic components of the liquid present in the wet sludge aeration vessel by at least 30%.

* * * * *